UNITED STATES PATENT OFFICE.

THOMAS S. HARRISON, OF PHILADELPHIA, PENNSYLVANIA, ASSIGNOR TO HARRISON BROTHERS & CO., OF SAME PLACE.

MANUFACTURE OF ALUMINOUS CAKE.

SPECIFICATION forming part of Letters Patent No. 253,377, dated February 7, 1882.

Application filed June 7, 1881. (No specimens.)

*To all whom it may concern:*

Be it known that I, THOMAS S. HARRISON, of Philadelphia, Pennsylvania, have invented a new and useful Improvement in the Manufacture of Aluminous Cake for Paper-Maker's Use, of which the following is a specification.

The object of my invention is to provide a blue aluminous cake for use in the manufacture of blue paper and similar articles.

Heretofore in the manufacture of blue paper in which white aluminous cake has been employed as a sizing material it has been usual to obtain the desired color of the finished paper by the addition of commercial Prussian or aniline blue to the paper-stock a method involving considerable labor and expense to the paper-maker. I have discovered that a blue aluminous cake may be obtained directly from ferruginous aluminous clays in the following manner.

A solution of ferruginous aluminous sulphate is first made from ferruginous aluminous clay in the usual manner, from this solution the silica is allowed to settle out or is by any suitable means removed. To this solution is added such sufficient quantity of prussiate of potash, as will precipitate as prussiate of iron all or nearly all of the peroxide of iron in said solution; this solution, with the precipitated prussiate of iron therein, is then concentrated with the result that a dark-blue aluminous cake is thereby obtained.

In practice I employ from three and one-half to four parts of prussiate of potash to one part of peroxide of iron present in the solution of ferruginous sulphate of alumina.

Heretofore prussiate of potash has been employed to precipitate iron from aluminous solutions and when so employed care has been taken to remove the precipitated iron from the aluminous product. In my invention the precipitated iron remains in and forms an essential part of the aluminous product obtained.

It is obvious that by selecting aluminous clay containing more or less iron, a cake may be produced which will contain as much prussiate of iron or Prussian blue as may be desired.

Having thus described my invention, I claim and desire to secure by Letters Patent of the United States:

As a new article of manufacture, a blue colored aluminous cake containing ferro cyanide of iron as set forth.

In testimony whereof I have hereunto signed my name this 23d day of May, A. D 1881,

THOMAS S. HARRISON.

In presence of—
W. C. STRAWBRIDGE,
J. BONSALL TAYLOR